(12) United States Patent
Le Blanc

(10) Patent No.: US 10,561,265 B2
(45) Date of Patent: Feb. 18, 2020

(54) CHILD COOKWARE SAFETY DEVICE

(71) Applicant: Eric Le Blanc, Murrieta, CA (US)

(72) Inventor: Eric Le Blanc, Murrieta, CA (US)

( * ) Notice: Subject to any disclaimer, the term of this patent is extended or adjusted under 35 U.S.C. 154(b) by 184 days.

(21) Appl. No.: 15/494,512

(22) Filed: Apr. 23, 2017

(65) Prior Publication Data

US 2018/0303267 A1    Oct. 25, 2018

(51) Int. Cl.
*A47J 27/00* (2006.01)
*A47J 36/34* (2006.01)

(52) U.S. Cl.
CPC ............ *A47J 27/002* (2013.01); *A47J 36/34* (2013.01)

(58) Field of Classification Search
CPC ........ A47J 27/002; A47J 36/34; F24C 15/107
USPC .......................................................... 220/630
See application file for complete search history.

(56) References Cited

U.S. PATENT DOCUMENTS

| | | | | |
|---|---|---|---|---|
| 3,170,457 | A * | 2/1965 | Bucellato | F24C 15/107 126/214 C |
| 5,002,039 | A | 3/1991 | Esposito | |
| 5,474,206 | A * | 12/1995 | Herring, Sr. | A47J 43/0727 220/630 |
| 5,638,806 | A * | 6/1997 | Foust | A47J 36/34 126/214 A |
| 7,637,388 | B2 * | 12/2009 | Schantz | A47G 19/02 220/574 |
| 8,297,272 | B2 | 10/2012 | Williams et al. | |
| 2007/0277802 | A1 | 12/2007 | Reed | |
| 2016/0298854 | A1 | 10/2016 | Kuhn | |
| 2016/0327282 | A1 | 11/2016 | Lee | |

FOREIGN PATENT DOCUMENTS

WO    WO/2014/015398    1/2014

* cited by examiner

*Primary Examiner* — James N Smalley
*Assistant Examiner* — Madison L Poos

(57) ABSTRACT

Embodiments of the invention relate to a cookware safety device. More particularly, the present invention pertains to cooking vessels, such as pots and pans, having a safety feature which is configured to lock to the burner grate of a stovetop, preventing these types of cookware devices from tipping or being pulled off from the stovetop. Further, the present invention provides a guiding mechanism formed on the bottom of the cookware device which places the handle of the cookware device in a position that does not extend beyond the front of the stovetop.

9 Claims, 18 Drawing Sheets

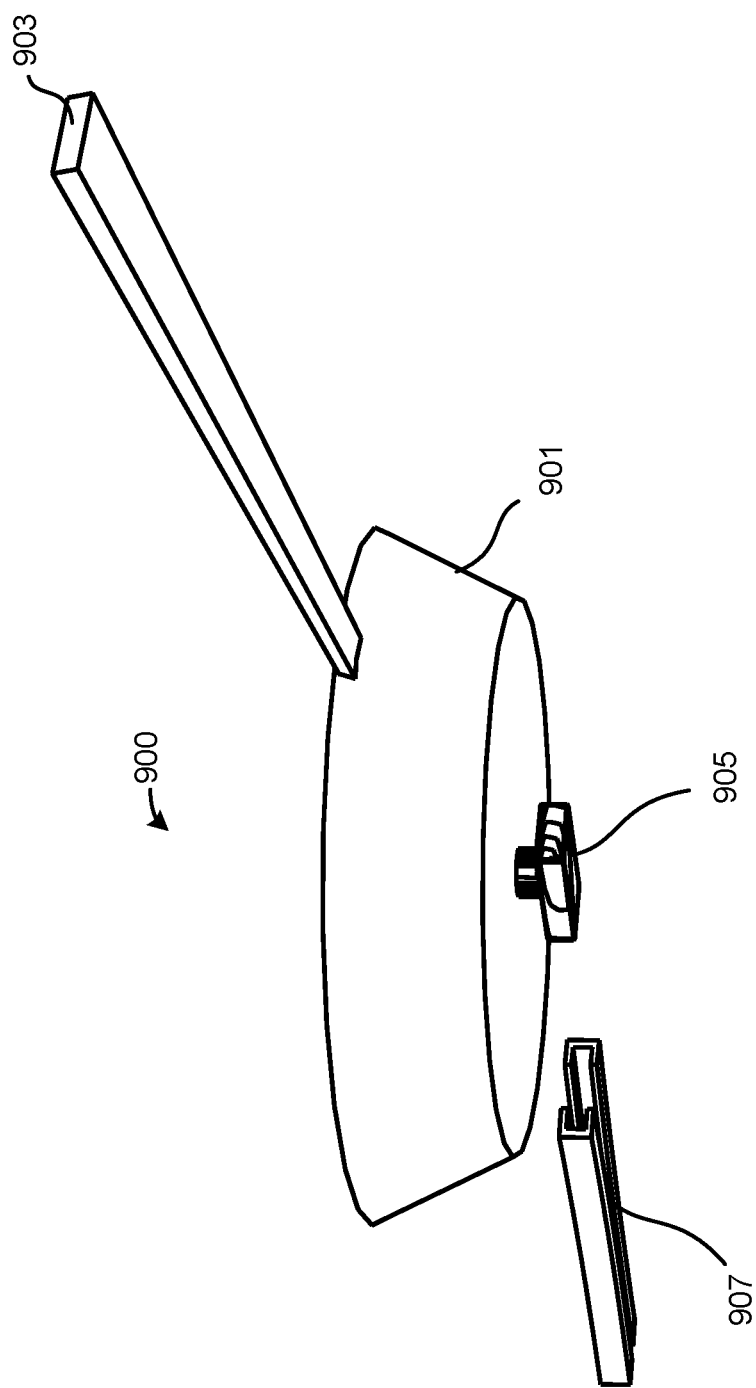

CHILD COOKWARE SAFETY DEVICE

FIELD OF THE INVENTION

The present invention relates to a child cookware safety device. More particularly, the present invention pertains to cooking vessels, such as pots and pans, having a safety feature which is configured to lock to the burner grate of a stovetop, preventing these types of cookware vessels from accidentally tipping or being pulled off from the stovetop by a child. Further, the present invention provides a guiding mechanism formed on the bottom of the cookware device which guides the handle of the cookware device in a position that does not extend beyond the front of the stovetop and out of reach to small children.

BACKGROUND

Burn injuries to children in the United States which require medical attention are in the hundreds of thousands each year based on some recent burn statistics of children between 1-17 years old. A substantial number of these injuries are frequently related to scalds from spilled food such as, for example, when a child pulls a pot off of a stovetop.

To prevent such injuries, some stovetop safety devices are available which are designed to retain, cover, or prevent access to the cooking vessels on the stovetop. One example of a stovetop safety device includes a stove pot retainer having a retaining member contacting the sides of a cooking vessel to support the vessel in unstable conditions. In another example, the stovetop safety device may include lateral securing elements which are fixed onto the stove by means of suction cups, the lateral securing elements holding the pot or pan in place, making accidents less likely. In yet another example, the stovetop safety device may include a burner grate flame deflector having a plate-like member and a downwardly extending protective skirt for preventing flames or heat from heating a pot handle.

These stovetop safety devices may provide some protection for adult users but may generally lack the necessary failsafe mechanisms that specifically protect children from stovetop related burn injuries. Therefore, there is a need for a stovetop safety device that is specifically configured to prevent tipping or pulling a cookware vessel off of the stovetop, thereby decreasing the risk of burn injuries or death to small children.

SUMMARY

An object of this invention is the provision of a safety cookware apparatus for the prevention of a cookware vessel of being easily tipped or pulled off of the stovetop, thereby decreasing the possible injuries small children. It is an advantage of the present invention to provide a safety cooking vessel for use on a stovetop having a front side, a burner grate and a gas burner, the safety cooking vessel including a body having a top side and a bottom side, a handle mounted near the top side portion of the body, the handle projects along a centerline of the body, a first safety guide member coupled to the bottom side of the body, the first safety guide member includes a first guide structure having a first coupling member, a longitudinal direction of the first guide structure is substantially positioned along the centerline of the body, and a second safety guide member coupled to the burner grate of the stovetop, the second safety guide member includes a second guide structure having a second coupling member, a longitudinal direction of the second guide structure is substantially parallel to the front of the stovetop and centrally positioned over the gas burner, and the second coupling member is configured to receive the first coupling member.

It is another advantage of the present invention to provide a u-shaped channel configuration and the second guide structure of the second safety guide member includes an elongated rectangular bar.

It is another advantage of the present invention to provide a stem and an attachment member coupled to a first end of the stem, wherein a second end of the stem is coupled to the bottom side of the body.

It is yet another advantage of the present invention to provide a safety cooking and grate device for use on a stovetop having a front side and a gas burner, the safety cooking and grate device having a body having a top side and a bottom side; a handle mounted near the top side portion of the body, the handle projects along a centerline of the body, a first safety guide member coupled to the bottom side of the body, the first safety guide member includes a first guide structure having a first coupling member, a longitudinal direction of the first guide structure is substantially positioned along the centerline of the body, and a safety burner grate, the safety burner grate includes a support base having a top portion defining a first plane, a plurality of spaced grate support arms coupled to the top portion of the support base via a first set of support posts, and a second safety guide member attached to the top portion of the base support via a second set of support posts, the first set of support posts substantially raises the plurality of spaced grate support arms to a second plane which is substantially parallel to the first plane of the support base, and the second set of support posts raises the second safety guide member to the second plane, the second safety guide member includes a second guide structure having a second coupling member, a longitudinal direction of the second guide structure is substantially parallel to the front of the stovetop and centrally positioned over the gas burner, and the second coupling member is configured to receive the first coupling member.

These and other objects, features and advantages of the present invention will become more apparent in light of the following detailed description of preferred embodiments thereof, as illustrated in the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 9 illustrates a perspective view of another embodiment of a safety cooking vessel.

DETAILED DESCRIPTION

The present invention provides a benefit for small children by providing a safety mechanism which 1) positions the cooking vessel so that the handle of the cookware vessel does not extend beyond the front of the stovetop and 2) locks a cooking vessel to the burner grate of a stovetop, thereby preventing the handle of the cooking vessel from being out of reach or accidentally pulled off the stovetop by a child.

Figure 1:
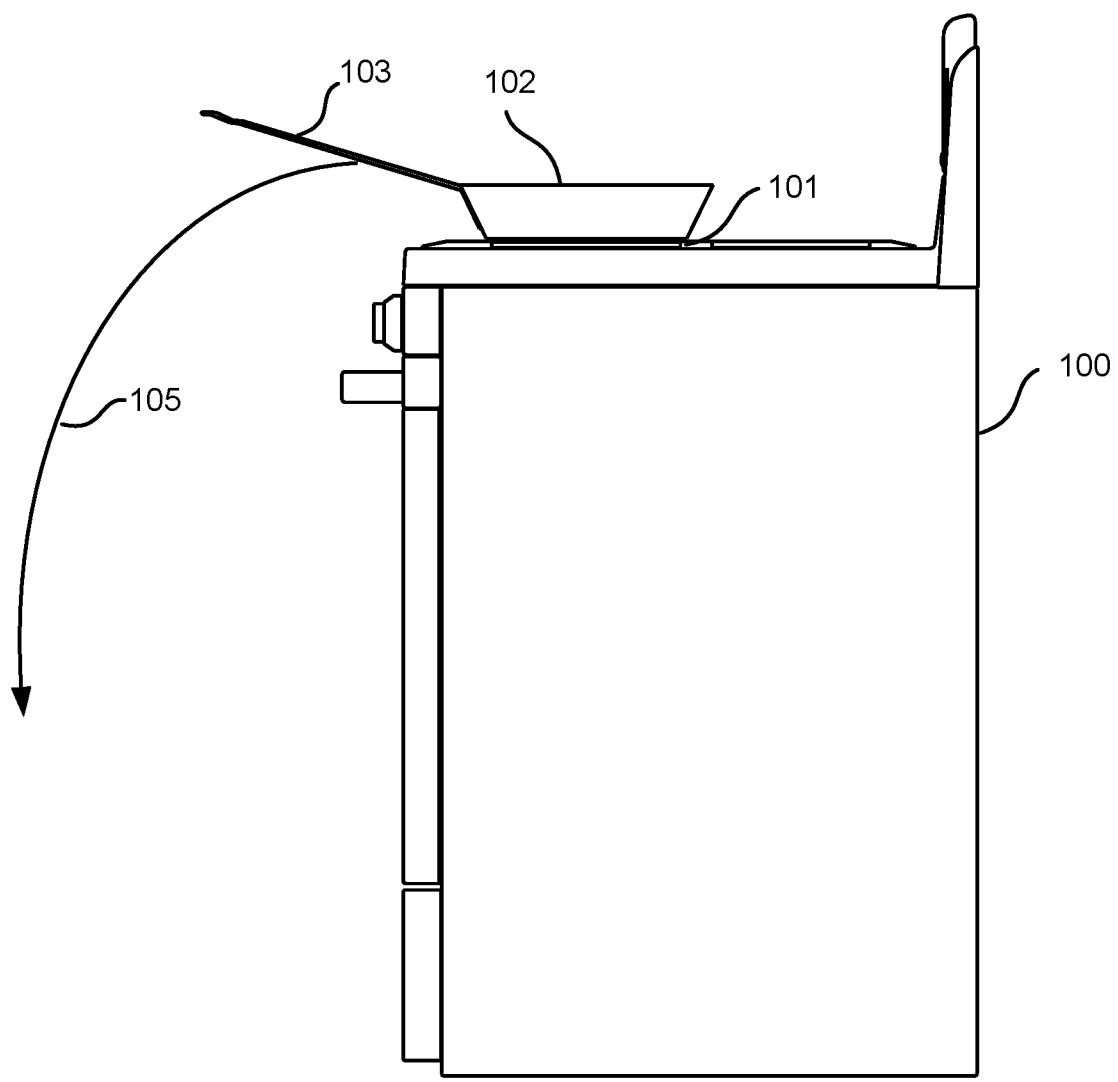
FIG. 1 illustrates a side view of a stovetop oven with a frying pan situated on the top of a burner grate of the stovetop.
Figure 2:
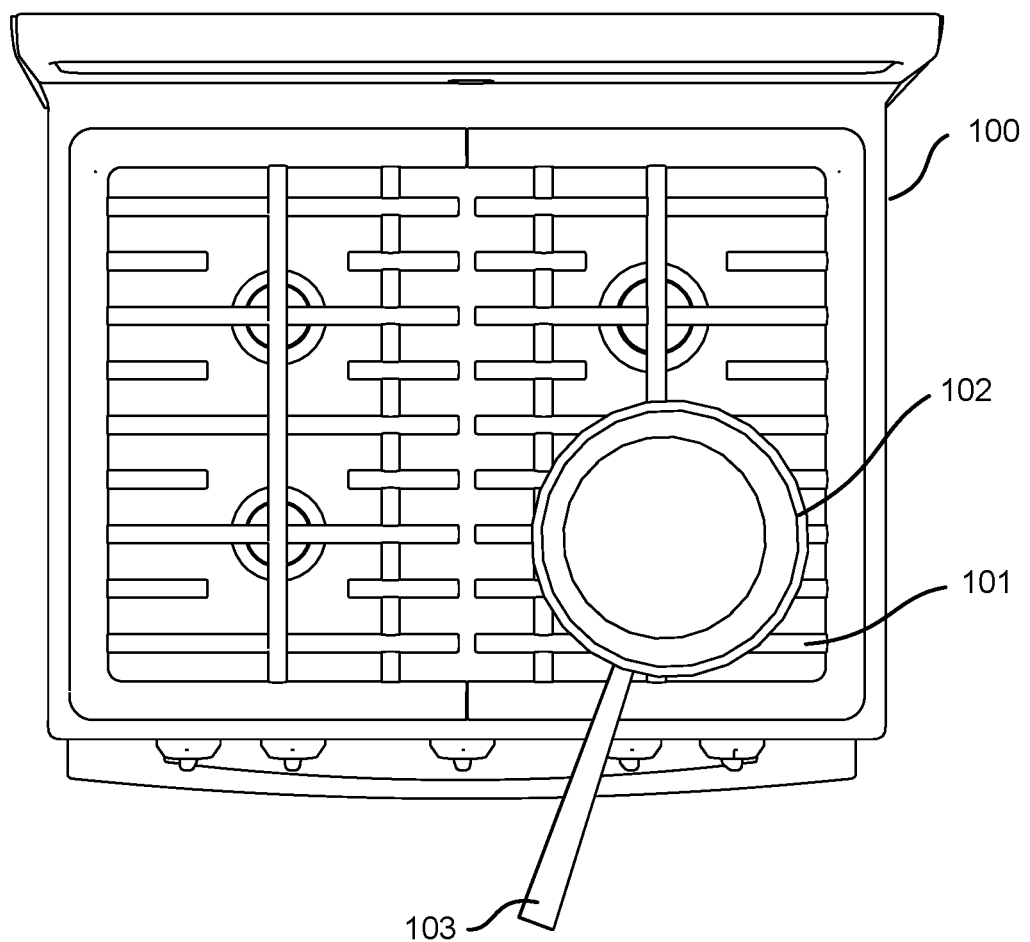
FIG. 2 illustrates a top view of the same stovetop oven with the pan situated on the top of the burner grate of the stovetop.

FIG. 1 illustrates a side view of a stovetop oven 100 with a frying pan 102 situated on the top of a burner grate 101 of the stovetop 100. In a typical cooking scenario, the pan 102 may include a handle 103 that is placed on the stovetop 100 so that the handle 103 extends beyond the front side of the stovetop 100, creating an unsafe condition for small children. For example, because the handle 103 is situated to the front of the stovetop 100, the handle 103 may be within reach for the child to pull and tip the pan 102 in a downward direction 105, potentially causing serious burn injuries to the child. FIG. 2 illustrates a top view of the same stovetop oven 100 with the pan 102 situated on the top of the burner grate 101 of the stovetop 100.

Figure 3A:
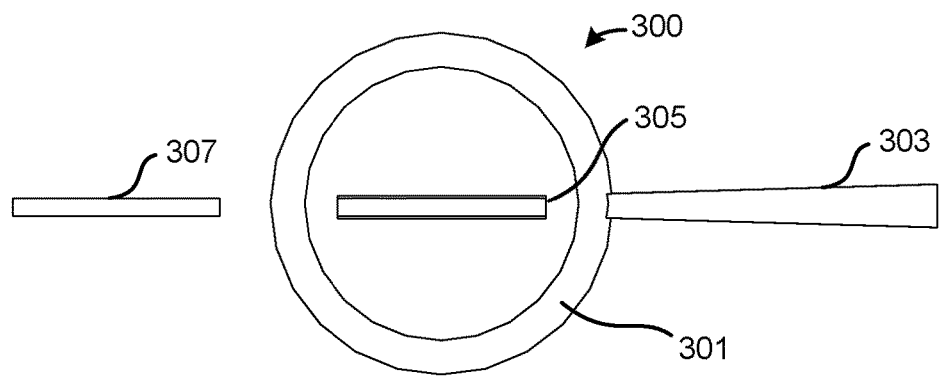
FIGS. 3A-3D illustrate multiple views of a safety cooking vessel, in accordance with an embodiment.
Figure 3B:
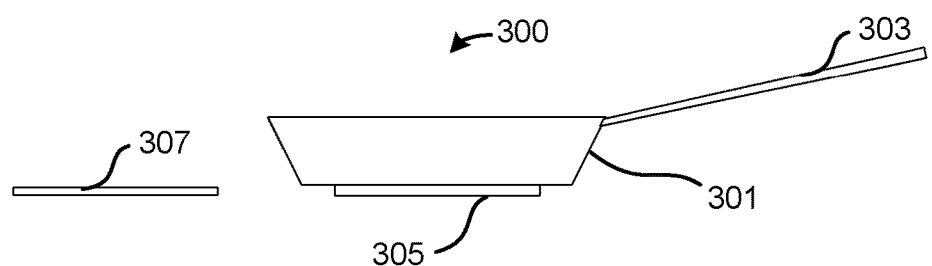
Figure 3C:
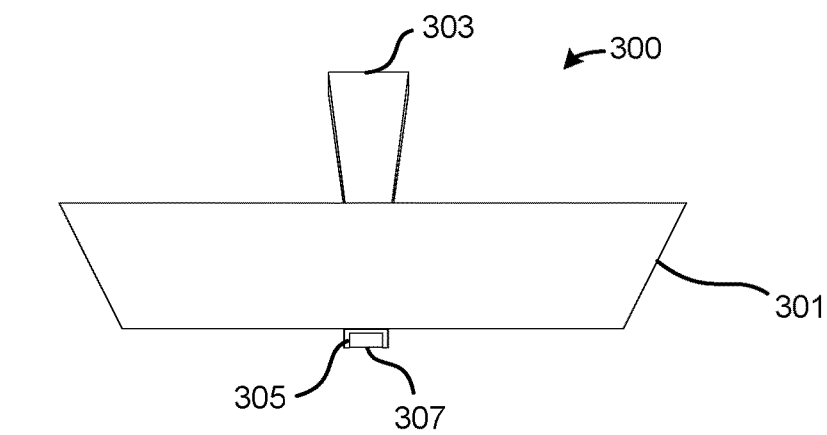
Figure 3D:
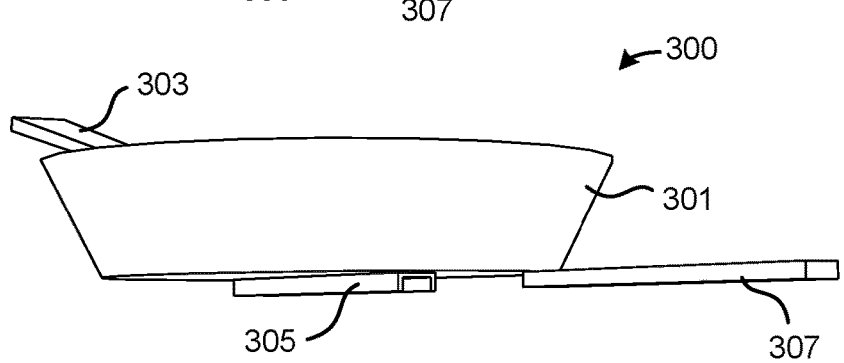

FIG. 3A illustrates a bottom side view of a safety cooking vessel 300 (i.e., pot or pan) having a body 301, an optional handle 303 mounted near the top side portion of the body 301, a first safety guide member 305 fastened to the bottom side of the body 301 and a second safety guide member 307 onto which the first guide member 305 is inserted, in accordance with an embodiment. Both safety guide members (305, 307) may be generally similar in length, not exceeding the length of the bottom side of the body 301. In this example, the first safety guide member 305 may include a U-Guide channel while the second safety guide member 307 may include an elongated rectangular bar. In practice, the safety guide members (305, 307) may be made out of various types of metal or glass materials which are ideal for cooking such as stainless steel, copper, aluminum, or cast iron. In addition, the first safety guide member 305 may be permanently fastened to the bottom side of the body 301 using welding techniques or temporarily fastened using threaded screws and corresponding threaded holes formed in the both the first safety guide member 305 the bottom side of the body 301. In yet another implementation, the first safety guide member 305 may be and the bottom side of the body 301 may be formed as a single unit using metal or glass shaping, metal injection molding, or advanced 3D metal or glass printing techniques. Although the cooking vessel in this embodiment is generally circular in shape, the safety guide members (305, 307) may be applied to other types and shapes of cooking vessels such as rectangular, oval, hexagonal or other oddly shaped pots or pans. Other views of the safety cooking vessel 300 are provided in FIG. 3B-FIG. 3D and further illustrate the general shapes and sizes of the safety guide members (305, 307). For example, FIG. 3B illustrates a side view of the cooking vessel 300 providing the relative heights of the safety guide members (305, 307) with respect to the safety cooking vessel 300; FIG. 3C illustrates a front of the safety cooking vessel 300 providing the relative widths of the safety guide members (305, 307) with respect to the cooking vessel 300; and FIG. 3D illustrates a perspective view of the safety cooking vessel 300 providing the general shapes of the first safety guide member 305 and the second safety guide member 307.

Figure 4:
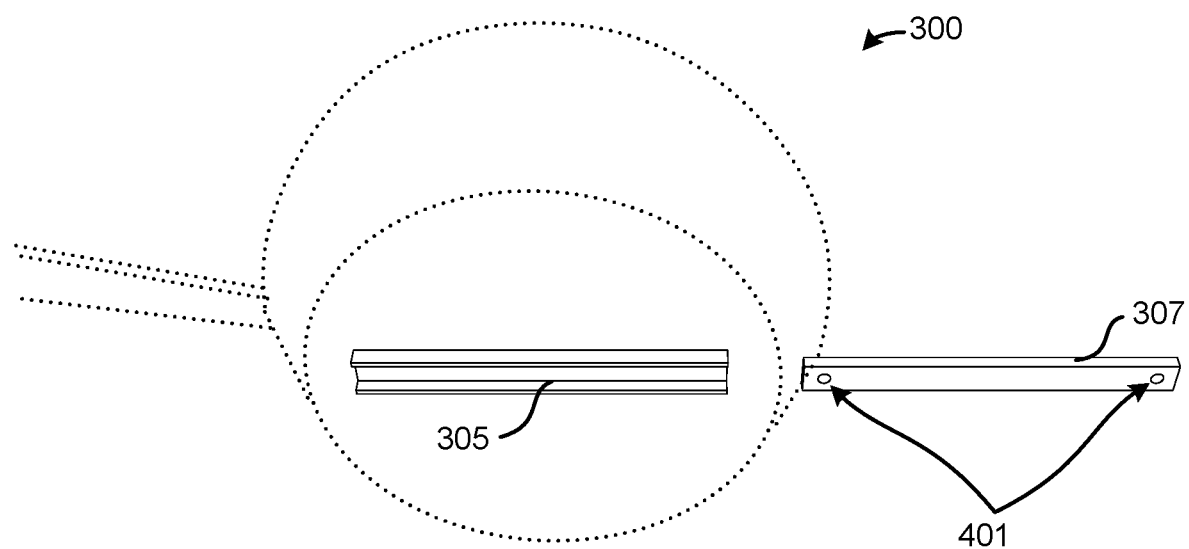
FIG. 4 illustrates a close-up perspective view of the first safety guide member and the second safety guide member as seen from the bottom side of the safety cooking vessel.

FIG. 4 illustrates a close-up perspective view of the first safety guide member 305 and the second safety guide member 307 as seen from the bottom side of the safety cooking vessel 300. In this illustration, the first safety guide member 305 is mounted to the safety cooking vessel 300, forming a single piece unit, while the second safety guide member 307 includes a pair of mounting holes 401 which may be used to mount the second safety guide member 305 to the stovetop 100, in accordance with another embodiment.

Figure 5:
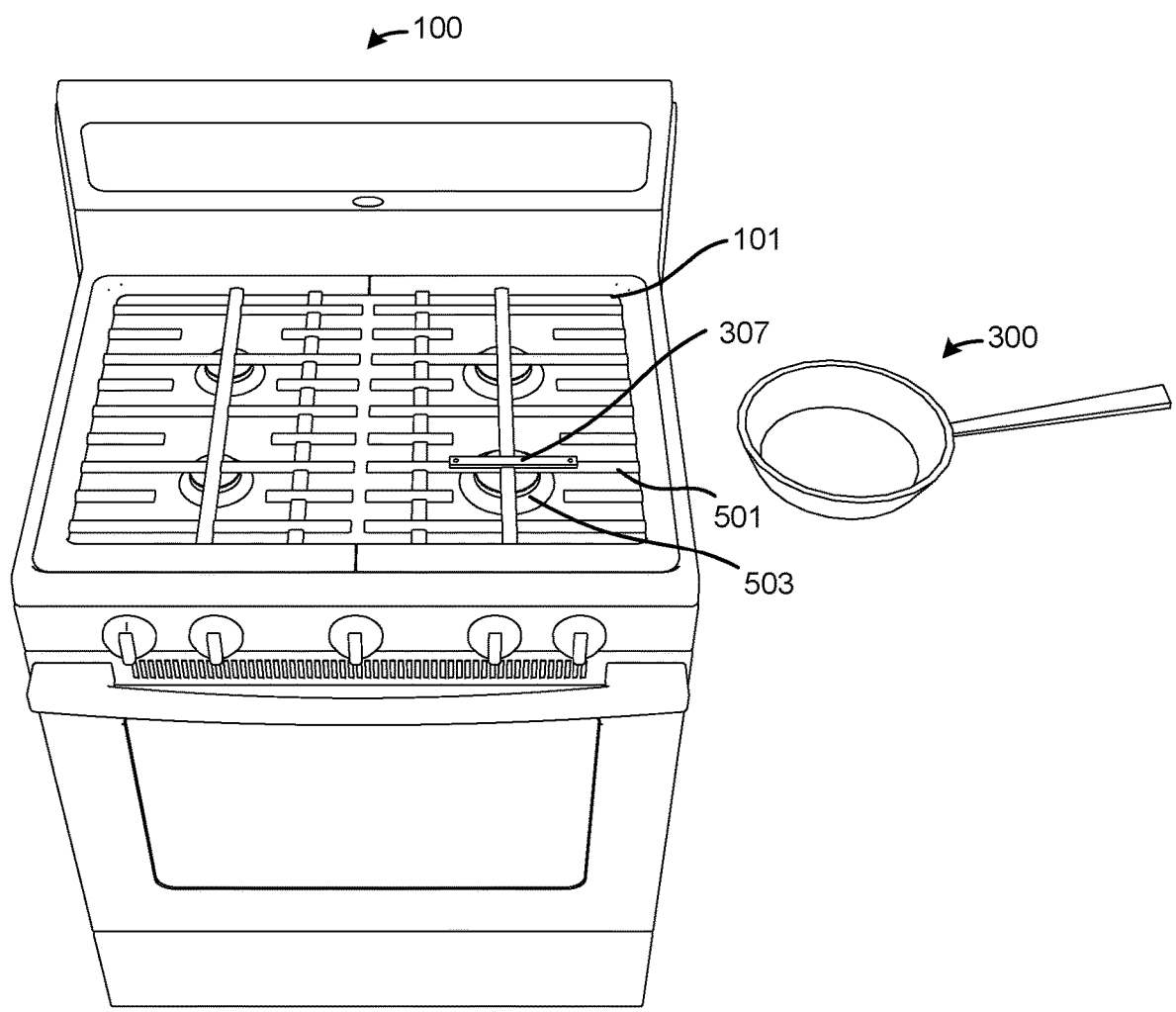
FIG. 5 illustrates a top perspective view of the stovetop oven, safety cooking vessel, the second safety guide member fastened to the burner grate of the stovetop.

FIG. 5 illustrates a top perspective view of the stovetop oven 100, safety cooking vessel 300, the second safety guide member 307 fastened to the burner grate 101 of the stovetop 100. In practice, the second safety guide member 307 is fastened to a top portion of a metal bar 501 of the burner grate 101 in a manner that the second safety guide member 307 runs parallel to the front of the stovetop 100 and centered to one of the front burners 503.

Figure 6:
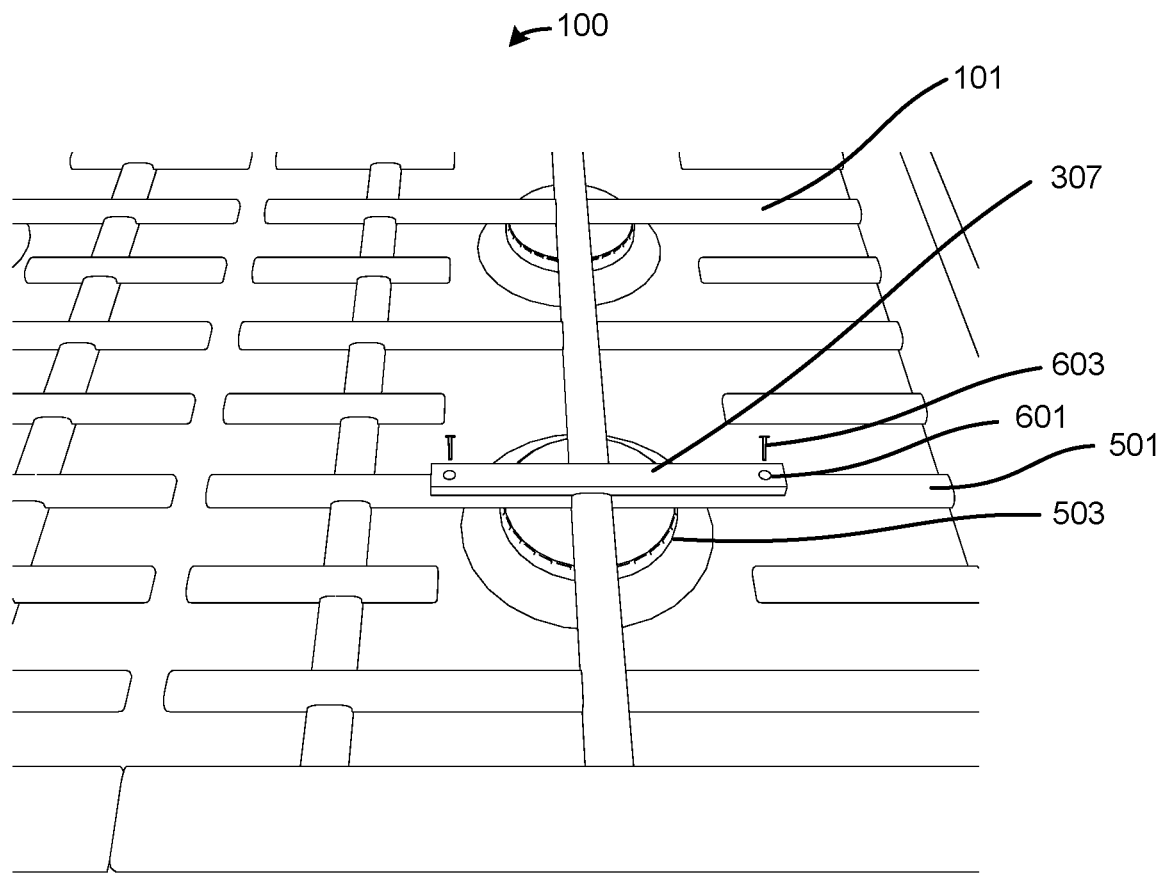
FIG. 6 illustrates a close-up top perspective view of the second safety guide member fastened to the burner grate of the stovetop.

FIG. 6 illustrates a close-up top perspective view of the second safety guide member 307 fastened to the burner grate 101 of the stovetop 100. In this illustration, the second safety guide member 307 may include a pair of holes at each end of the second safety guide member 307. A pair of metal threaded screws 603 may anchor the second safety guide member 307 to the portion of a metal bar 501 of the burner grate 101 through holes 601.

Figure 7:
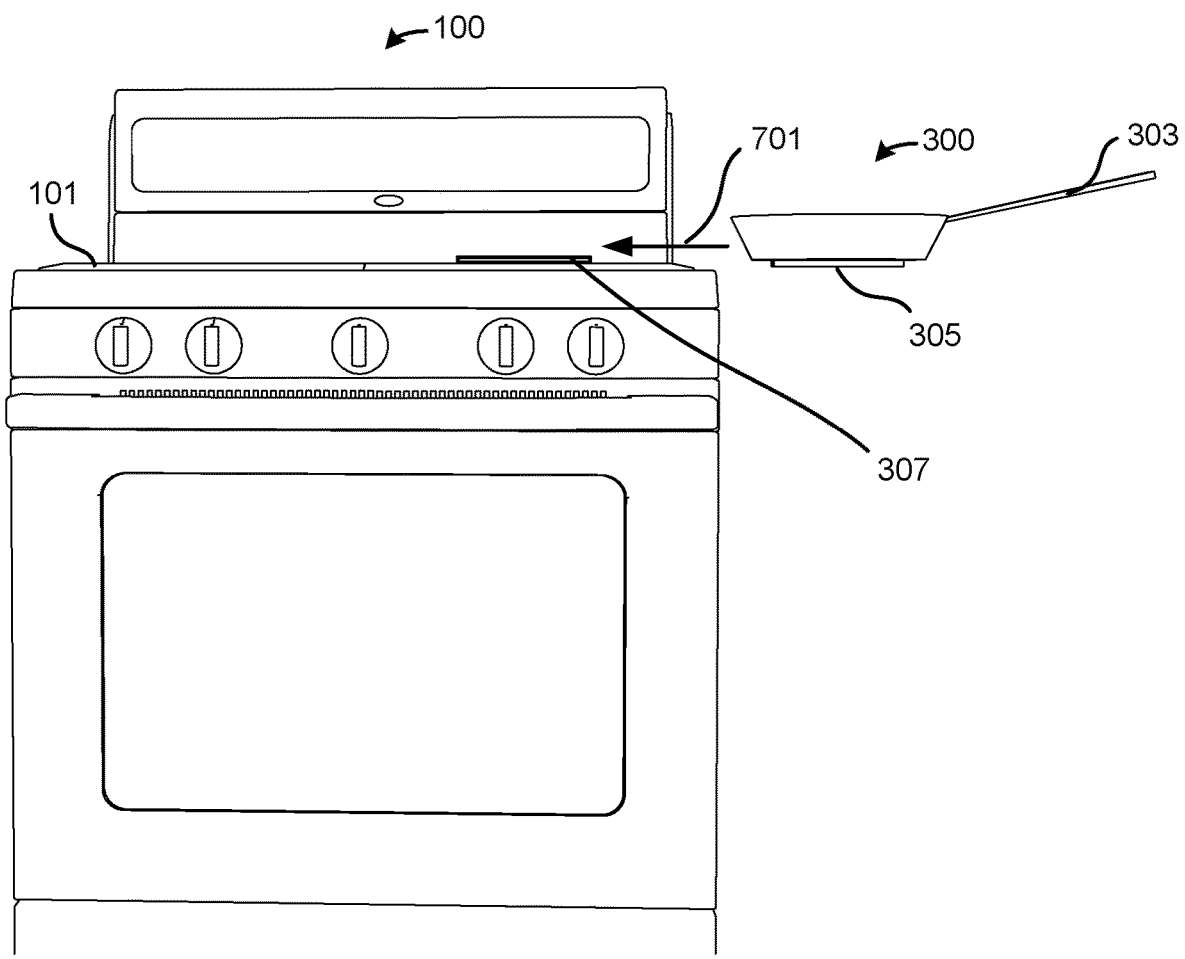
FIG. 7 illustrates a front view of the stovetop and cooking vessel, providing an example of mounting the safety cooking vessel to the second safety guide member which is secured to the burner grate of the stovetop, in accordance with an embodiment.

FIG. 7 illustrates a front view of the stovetop 100 and safety cooking vessel 300, providing an example of mounting the safety cooking vessel 300 to the second safety guide member 307 which is secured to the burner grate 101 of the stovetop 100, in accordance with an embodiment. In this example, the first safety guide member 305 of the safety cooking vessel 300 is secured to the second safety guide member 307 by inserting the U-channel of the first safety guide member 305 into the bar of the second safety guide member 307 in the direction 701 shown in FIG. 7, resulting in the optional handle 303 is being generally parallel to the front of the stovetop 100.

Figure 8:
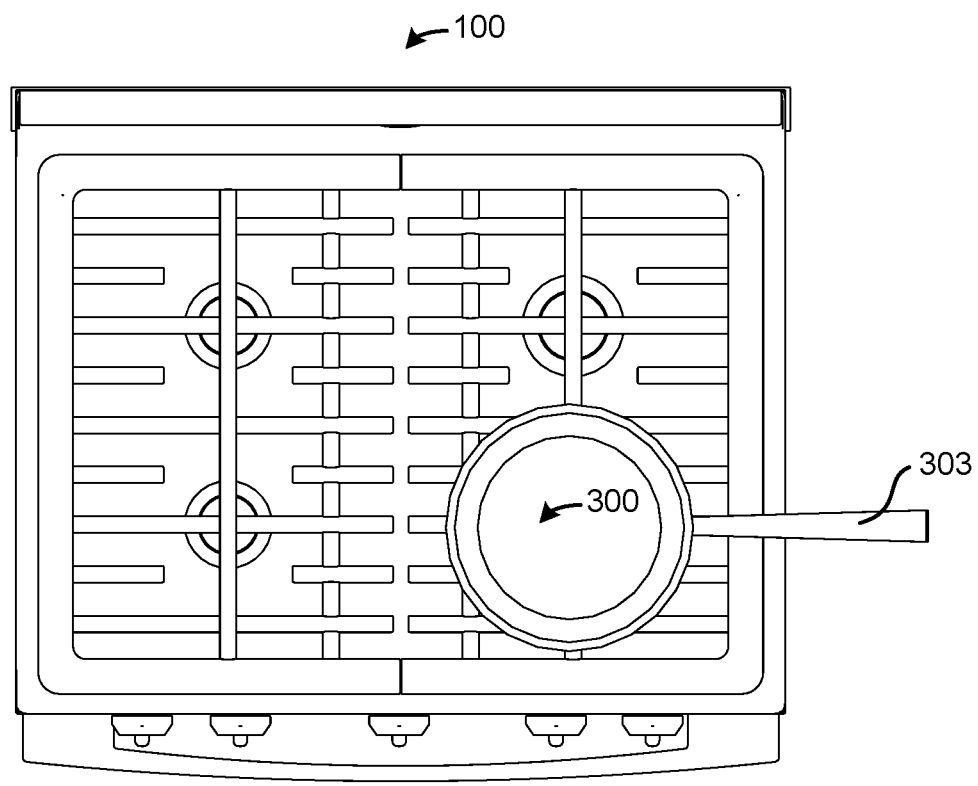
FIG. 8 illustrates a top view of the stovetop and safety cooking vessel, providing an example of the position and orientation of the handle of the safety cooking vessel relative to the stovetop.

FIG. 8 illustrates a top view of the stovetop 100 and safety cooking vessel 300, providing an example of the position and orientation of the handle 301 of the safety cooking vessel 300 relative to the stovetop 100. When properly secured to the stovetop 100, the handle 301 is configured to be substantially parallel to the front of the stovetop 100, causing the safety cooking vessel to be generally out of reach of the hands of small children.

Optional high powered magnets may be applied to a portion of the second safety guide member 307 to firmly secure the safety cooking vessel 300 to the burner grate 101, further decreasing the risk of the safety cooking vessel 300 of being pulled or tipped by a child from below and thereby enhancing the safety of the safety cooking vessel 300. In practice, the dimensions of both the first and second safety guide members (305, 307) are not intended to exceed the maximum length of the bottom of the safety cooking vessel 300.

FIG. 9 illustrates a perspective view of another embodiment of a safety cooking vessel 900 having a body 901, an optional handle 903 mounted near the top side portion of the body 901, a first safety guide member 905 fastened to the bottom side of the body 901 and a second safety guide member 907 into which the first guide member 905 is inserted, in accordance with another embodiment.

Figure 10A:
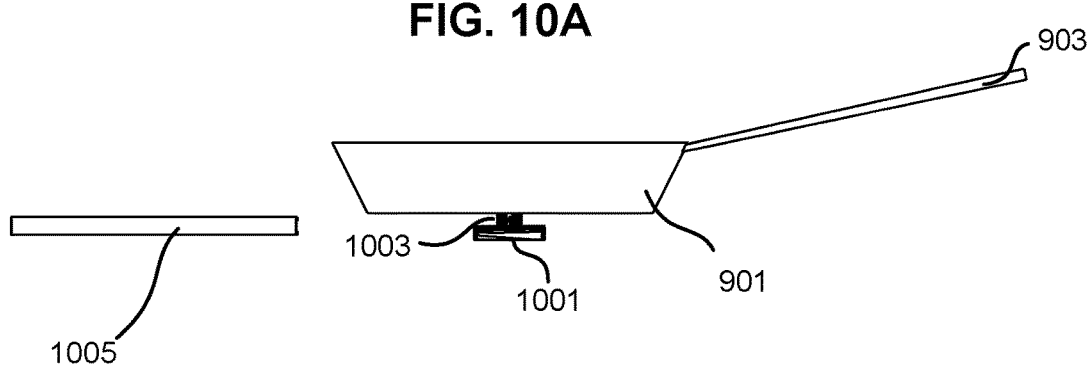
FIGS. 10A-10C further illustrate a side view, a bottom view, and a back view, respectively of the safety cooking vessel.
Figure 10B:
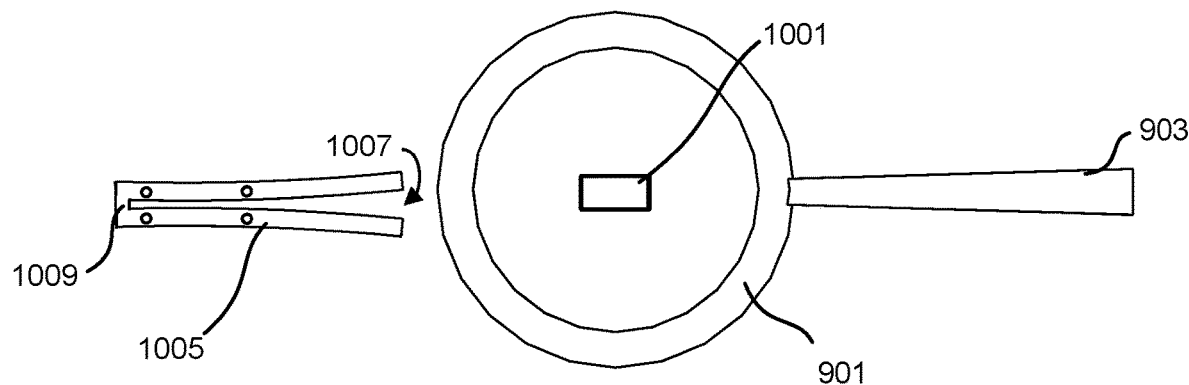
Figure 10C:
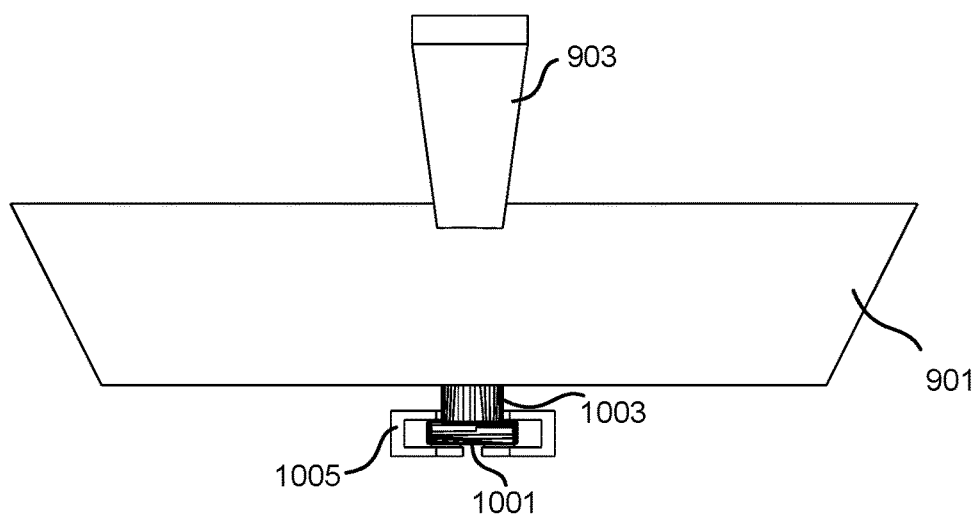

FIGS. 10A-10C further illustrate a side view, a bottom view, and a back view, respectively of the safety cooking vessel 900. These illustrations demonstrate structural features of the safety cooking vessel 900 including relative size and shape of the first safety guide member 905 and a second safety guide member 907. For example, as demonstrated in 10A-10C, a small narrow rectangular block 1001 having a stem 1003 attached thereon may define the structure of the first safety guide member 905 while a tapered U-channel guide structure 1005 having an open end 1007 and a closed end 1009 may define the second safety guide member 907. In practice, the open end 1007 of the tapered U-channel guide structure 1005 is configured to receive the small narrow rectangular block 1001 which fits into a narrow channel formed in the tapered U-channel guide structure 1005. This narrow configuration near the center of the tapered U-channel guide structure 1005 may form a locking mechanism between the small narrow rectangular block 1001 and the tapered U-channel guide structure 1005 when the small narrow rectangular block 1001 is partially inserted into the tapered U-channel guide structure 1005, preventing the safety cooking vessel 900 to be pulled in an upward direction.

Figure 11A:
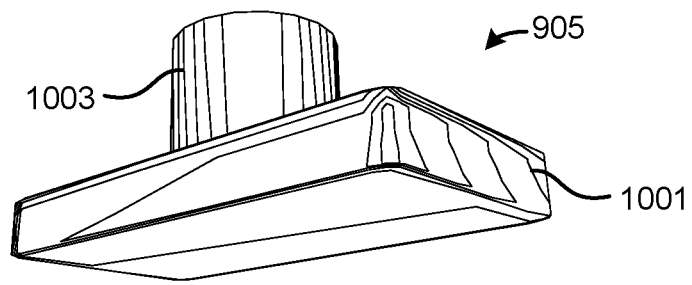
FIGS. 11A-11C illustrate a perspective view, a side view, and a top view, respectively, of the small narrow rectangular block and stem which together define the first safety guide member.
Figure 11B:
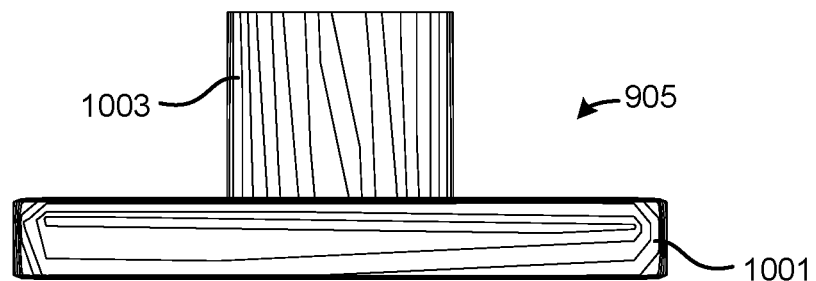
Figure 11C:
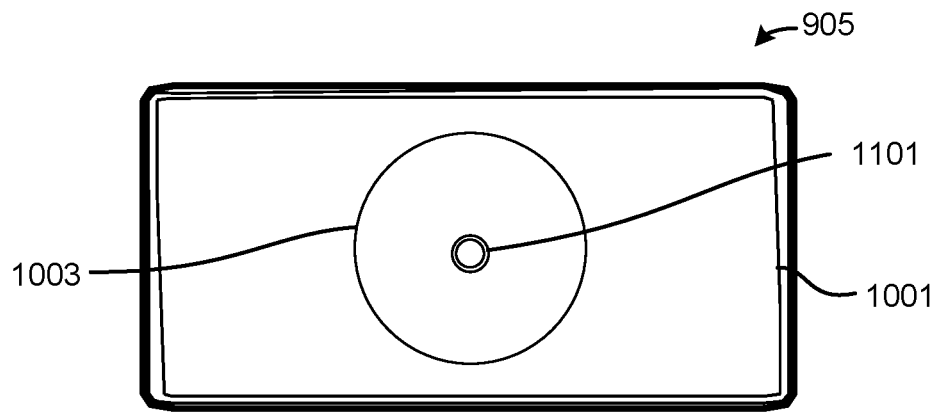
Figure 12A:
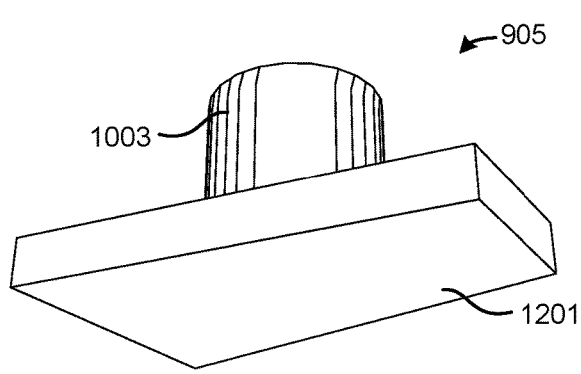
FIGS. 12A-12D illustrate a perspective view, a top view, a long side view, and a short side view, respectively, of an alternative configuration of the first safety guide member, in accordance to embodiment.
Figure 12B:
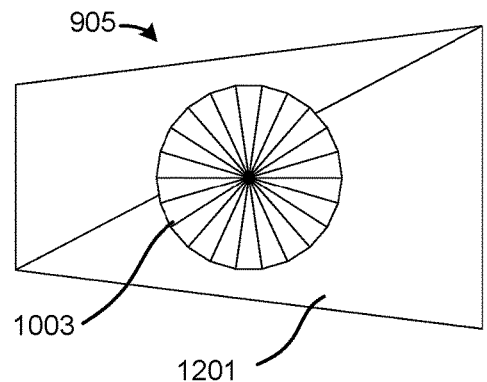
Figure 12C:
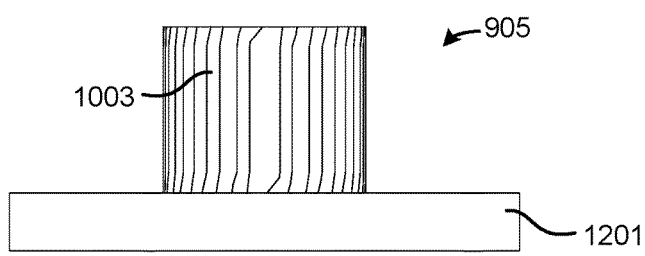
Figure 12D:
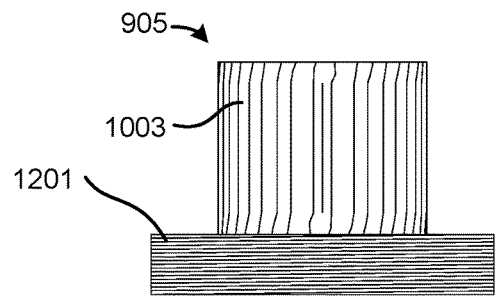

FIGS. 11A-11C illustrate a perspective view, a side view, and a top view, respectively, of the small narrow rectangular block 1001 and stem 1003 which together define the first safety guide member 905. In this example, the stem 1003 is generally cylindrical in shape and is attached to the small narrow rectangular block 1001. In alternative implementations, the stem 1003 may take other shapes such as a conical cylinder, a rectangular cuboid, a hexagonal prism, or other non-linear shapes. The stem 1003 portion of the first safety guide member 905 may be attached to the safety cooking vessel 900 by way of a combination of a threaded screw (not shown) formed on the bottom of the safety cooking vessel 900 and a corresponding threaded hole 1101 as shown in FIG. 11C formed in the stem 1003. Alternatively, the small narrow rectangular block 1001 and stem 1003 of the first safety guide member 905 and the safety cooking vessel 900 may be formed as a single piece unit using metal shaping, metal injection molding, or advanced 3D metal printing techniques.

FIGS. 12A-12D illustrate a perspective view, a top view, a long side view, and a short side view, respectively, of an alternative configuration of the first safety guide member 905, in accordance to embodiment. In this example, the stem 1003 is may be attached to a tapered rectangular bar 1201. Bar 1201 may be generally characterized as having a trapezoidal rectangular shaped body.

Figure 13A:
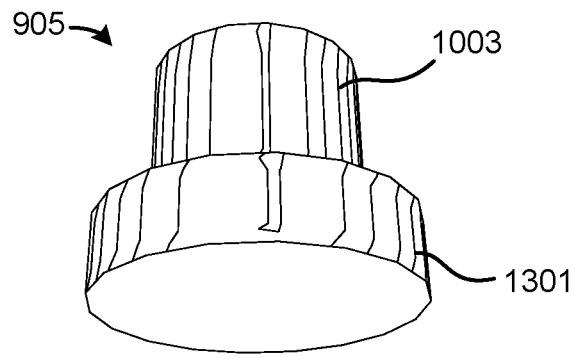
FIGS. 13A-13C illustrate a perspective view, a side view, and a top view, respectively, of another configuration of the first safety guide member, in accordance to embodiment.
Figure 13B:
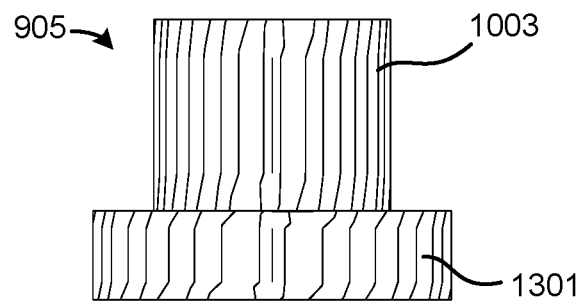
Figure 13C:
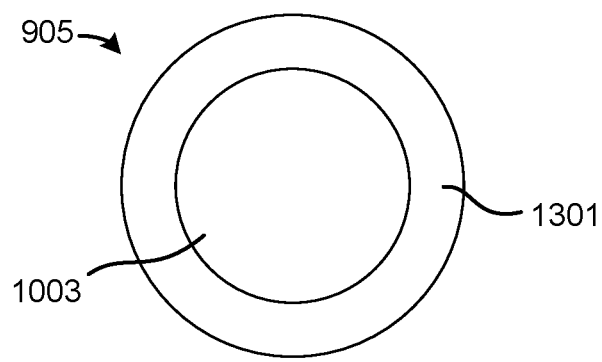

FIGS. 13A-13C illustrate a perspective view, a side view, and a top view, respectively, of another configuration of the first safety guide member 905, in accordance to embodiment. In this example, the stem 1003 may be attached to a cylindrically shaped body 1301 that is narrow in height relative to the stem 1003.

Figure 14:
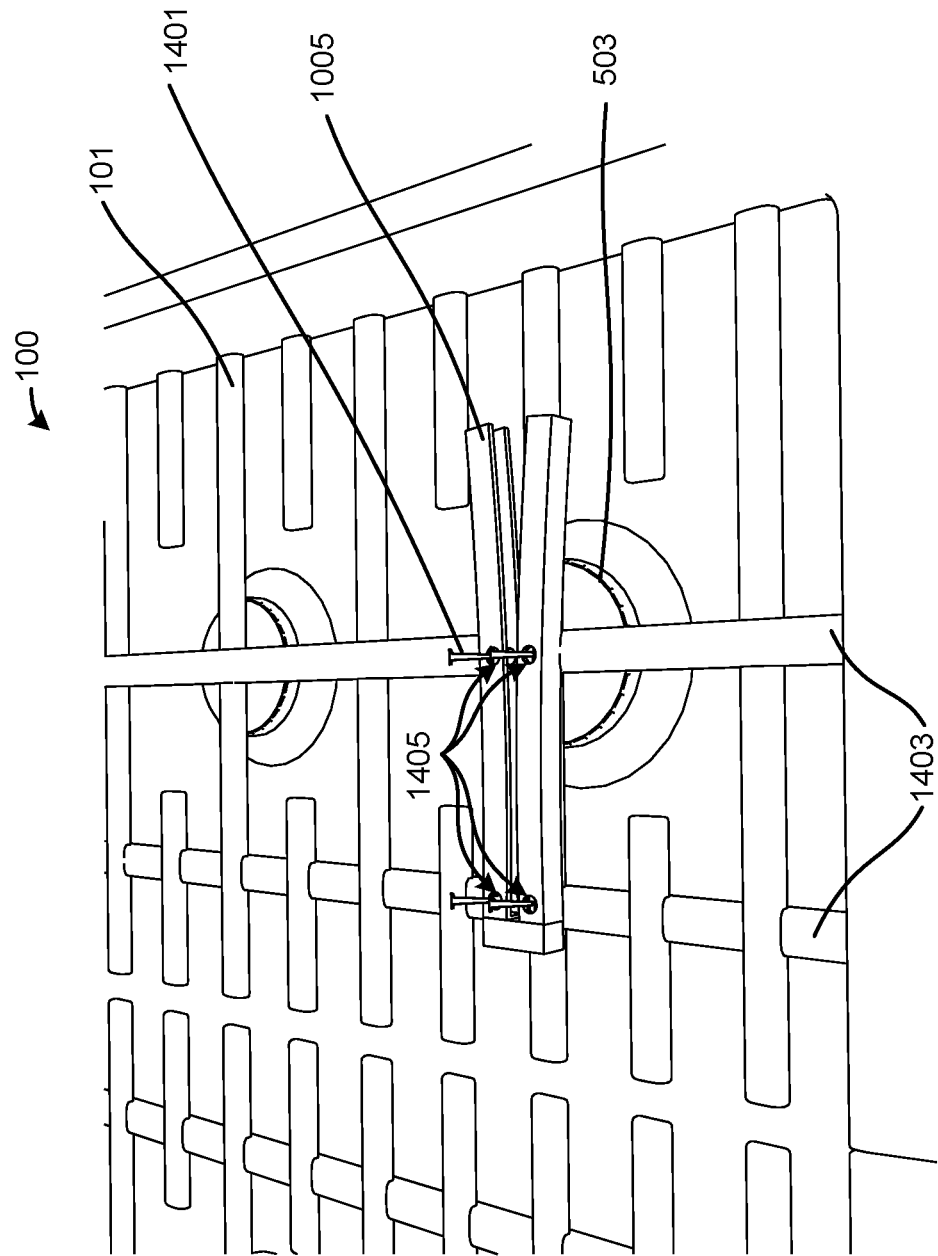
FIG. 14 illustrates a close-up top perspective view of the second safety guide member fastened to the burner grate of the stovetop.

FIG. 14 illustrates a close-up top perspective view of the second safety guide member 1005 fastened to the burner grate 101 of the stovetop 100. In this illustration, the second safety guide member 1005 may include multiple holes at each end of the second safety guide member 1005. Multiple metal threaded screws 1401 may anchor the second safety guide member 1005 to available metal bars 1403 of the burner grate 101 through holes 1405 formed in the second safety guide member 1005. In alternative embodiments, fastening the second safety guide member 1005 to the burner grate 101 may be accomplished using metal straps, welding, or other metal-to-metal clamping techniques.

Figure 15A:
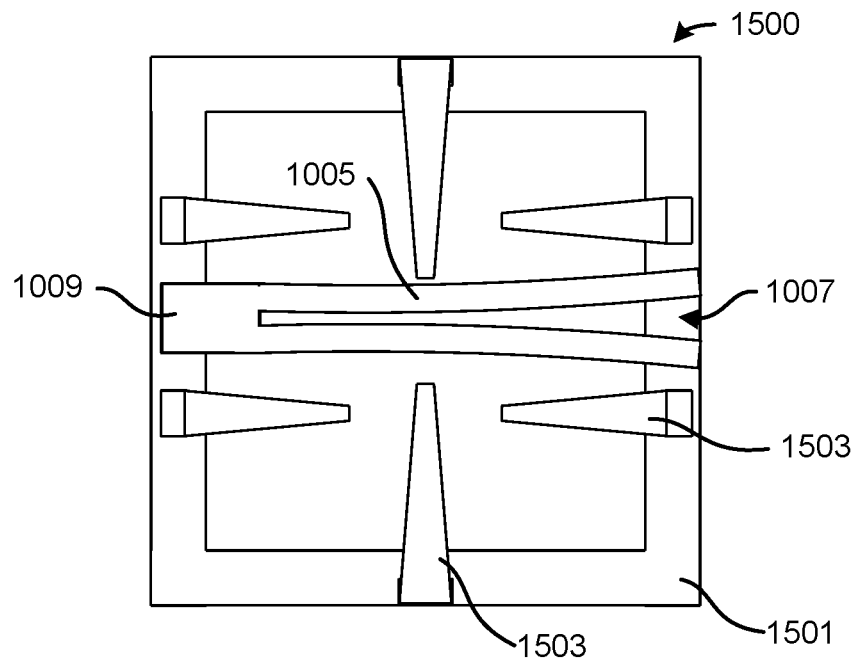
FIGS. 15A-15B illustrate a top view and a perspective view, respectively, of a single-piece safety burner grate structure including the second safety guide member, in accordance to embodiment.
Figure 15B:
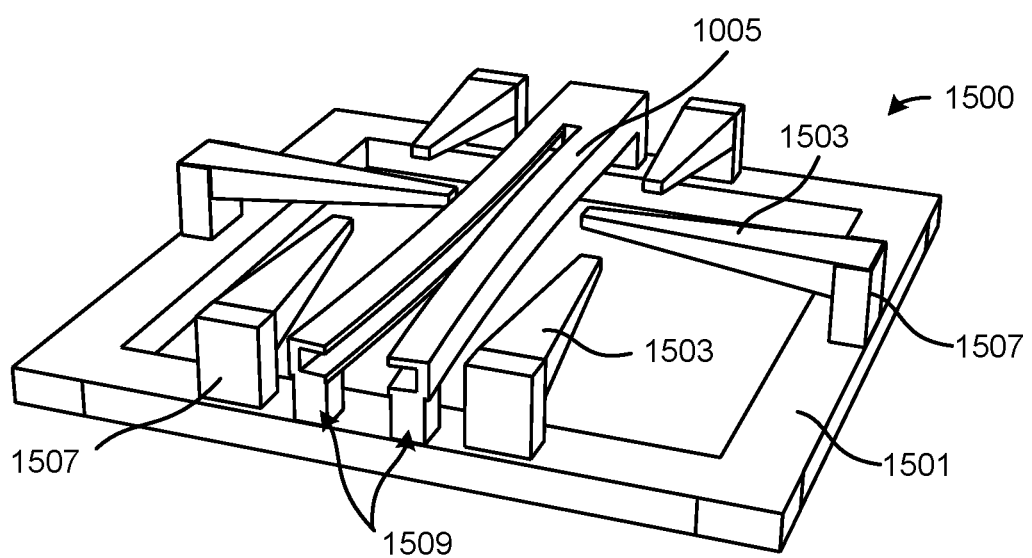

FIGS. 15A-15B illustrate a top view and a perspective view, respectively, of a single-piece safety burner grate structure 1500 with the second safety guide member 1005 integrated into the body of the single-piece safety burner grate structure 1500. For example, the single-piece safety burner grate structure 1500 may include a support base 1501 having a top portion defining a first plane, a plurality of spaced grate support arms 1503 coupled to the top portion of the support base 1501 via a first set of support posts 1507, and a second safety guide member 1005 attached to the top portion of the base support 1501 via a second set of support posts 1509, wherein the first set of support posts 1507 raises the plurality of spaced grate support arms 1503 to a second plane which is substantially parallel to the first plane of the support base 1501, and the second set of support posts 1509 raises the second safety guide member 1005 to the second plane. In practice, the top of the spaced grate support arms 1503 and the top of the of the second safety guide member 1005 are raised to a planar surface of the second plane, forming a flat surface to support a standard cookware device. Although the support base 1501 of the single-piece safety burner grate structure 1500 is generally rectangular in shape, the support base 1501 may be configured, shaped, and matched to fit into grate wells of stovetops having circular or other polygon-shaped configurations.

Figure 16A:
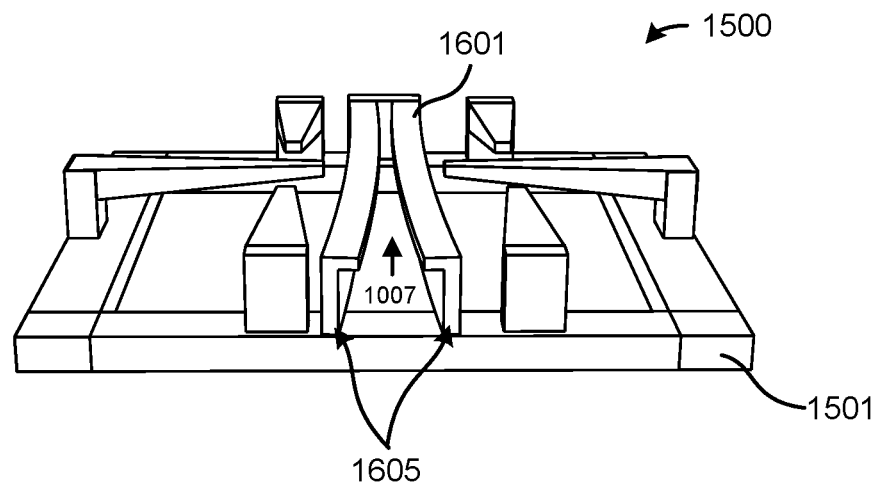
FIGS. 16A-16B illustrate a side perspective view and a top perspective view, respectively, of the single-piece safety burner grate structure having an alternative configuration of the second safety guide member, in accordance to embodiment.
Figure 16B:
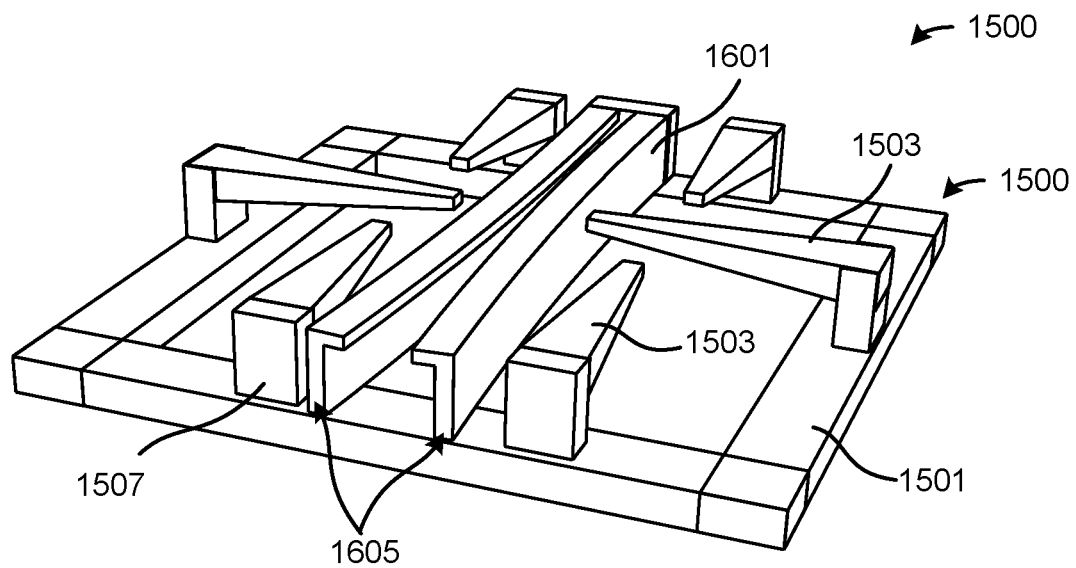

FIGS. 16A-16B illustrate a side perspective view and a top perspective view, respectively, of the single-piece safety burner grate structure 1500 having an alternative configuration of the second safety guide member 1601 integrated into the body of the single-piece safety burner grate structure 1500, according to another embodiment. In place of the U-channel guide structure 1005 shown in the previous example, the alternative second safety guide member 1601 may include a pair of L-shaped channel guide structures 1605 which are directly mounted to the support base 1501 of the single-piece safety burner grate structure 1500. In this embodiment, the pair of L-shaped channel guide structures 1605 may form a larger opening in comparison to the U-channel guide structure 1005 in the previous embodiment, providing an easier fit and insertion of the first safety guide member 905 into the second safety guide member 1601.

Figure 17:
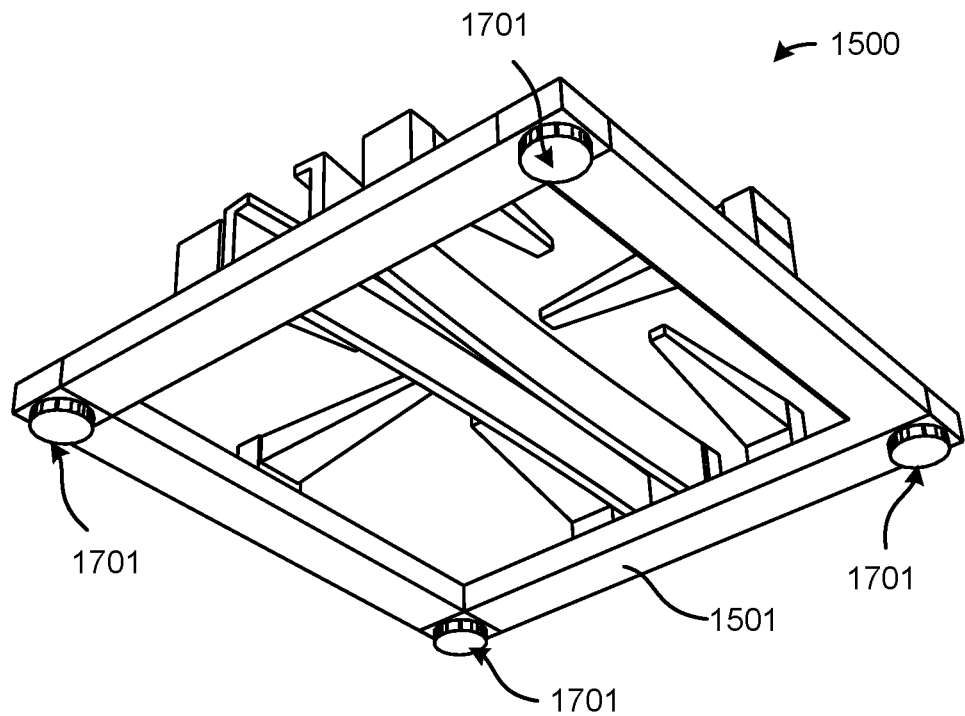
FIG. 17 illustrates a bottom perspective view, of the single-piece safety burner grate structure having a plurality of high-powered magnets, in accordance to embodiment.

FIG. 17 illustrates a bottom perspective view, of the single-piece safety burner grate 1500 structure having a plurality of high-powered magnets 1701 attached to the support base 1501 of the single-piece safety burner grate 1500. In practice, after the magnetic support base 1501 of the single-piece safety burner grate 1500 is placed on the stovetop 100, the magnetic force of each high-powered magnet 1701 may further enhance the stability and safety of the single-piece safety burner grate 1500 by making the single-piece safety burner grate 1500 difficult to remove or easily pulled-off from the stovetop 100.

Figure 18A:
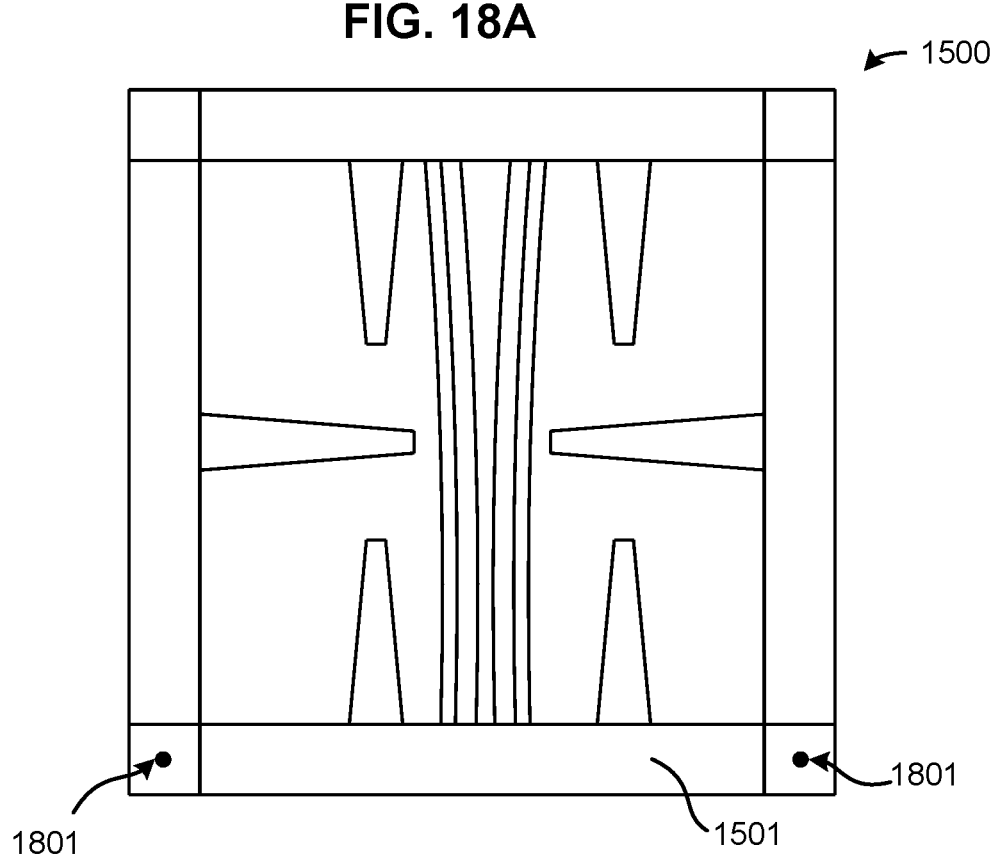
FIGS. 18A-18B illustrate a bottom view and a bottom perspective view, respectively, of the single-piece safety burner grate structure having one or more locking mechanisms, in accordance to embodiment.
Figure 18B:
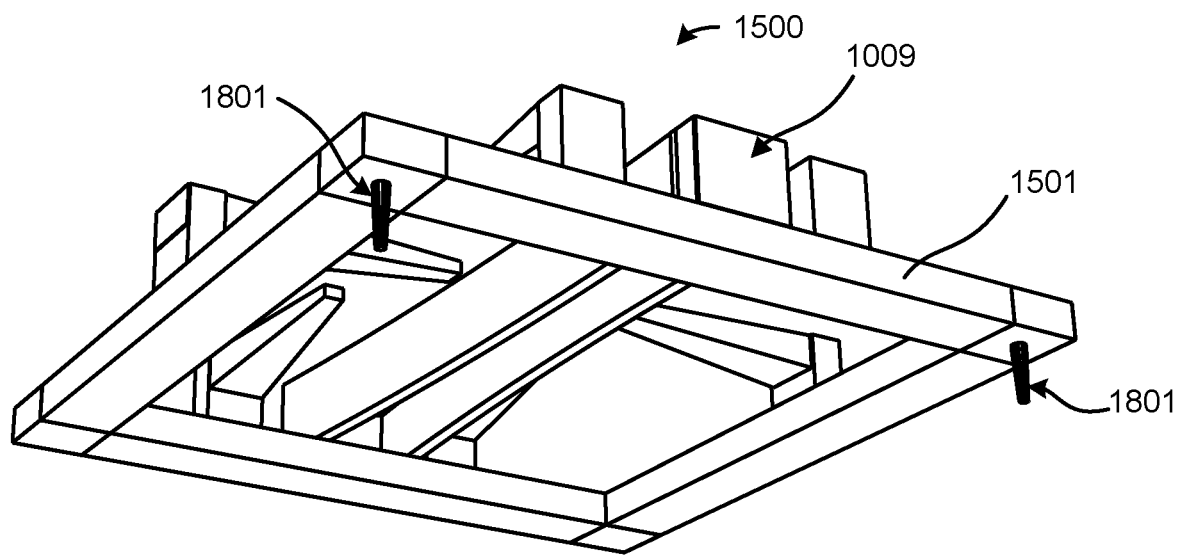

FIGS. 18A-18B illustrate a bottom view and a bottom perspective view, respectively, of the single-piece safety burner grate 1500 structure having one or more pins 1801. Each support pin 1801 act as locking mechanism which may be coupled on the bottom side of the support base 1501 near the closed end 1009 of the channel guide structure 1005 or 1605. In some applications, each support pin 1801 may be inserted into corresponding holes or slots (not shown) which are formed on the top surface of the stovetop 100. In addition, the pins 1801 of the single-piece safety burner grate 1500 are configured to be inserted only in one direction (e.g., top side only). Once inserted into the slots of the stovetop 100, each support pin 1801 prevents the single-piece safety burner grate 1500 from any lateral movement, making it difficult for a child to remove the single-piece safety burner grate 1500 from the front side of the stovetop 100. In place of pins 1801, other locking mechanisms may include j-hooks, l-hooks, or the like, according to another embodiment.

In other examples, the single-piece safety burner grate structure 1500 may be formed using metal shaping, metal injection molding, or advanced 3D metal printing techniques. In addition, the safety burner grate structure 1500 may replace existing burner grates on stovetop ovens without the need of modifying or drilling the second safety guide member into existing burner grates.

As used in the specification and the appended claims, the singular forms "a", "an", and "the" included plural referents unless the context clearly dictates otherwise.

The foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed, including:

1. A. safety cooking and grate device for use on a stovetop having a front side and a gas burner, the safety cooking and grate device comprising:
    a body having a top side and a bottom side;
    a handle mounted near the top side portion of the body, wherein the handle projects along a centerline of the body;
    a first safety guide member coupled to the bottom side of the body, wherein the first safety guide member includes a first guide structure having a first coupling member, wherein a longitudinal direction of the first guide structure is substantially positioned along the centerline of the body; and
    a safety burner grate, wherein the safety burner grate includes a support base having a top portion defining a first plane, a plurality of spaced grate support arms coupled to the top portion of the support base via a first set of support posts, and a second safety guide member attached to the top portion of the support base via a second set of support posts, wherein the first set of support posts substantially raises the plurality of spaced grate support arms to a second plane which is substantially parallel to the first plane of the support base, and the second set of support posts raises the second safety guide member to the second plane, wherein the second safety guide member includes a second guide structure having a second coupling member, wherein a longitudinal direction of the second guide structure is substantially parallel to the front side of the stovetop and centrally positioned over the gas burner, wherein the second coupling member is configured to receive the first coupling member, wherein the first guide structure includes a stem and an attachment member coupled to a first end of the stem, wherein a second end of the stem is coupled tom bottom side of the body, and wherein the second guide structure includes an L-shaped channel guide structure.

2. The safety cooking and grate device of claim 1, wherein the second guide structure includes an elongated u-shaped bar having a first bar end, a second bar end opposite the first bar end, a first outer side, a second outer side opposite the first outer side, a first interior side, and a second interior side opposite the first interior side, wherein the first bar end couples the first outer side to the second outer side, wherein a gap formed at the second bar end separates the first interior side from the second interior side, wherein a u-shaped channel is formed along an inner portion of the first interior side and along an inner portion of the second side interior side, the u-shaped channel configured to receive the attachment member.

3. The safety cooking and grate device of claim 1, wherein the attachment member has a shape of a rectangular block, wherein the rectangular block is substantially smaller in length than the elongated u-shaped bar.

4. The safety cooking and grate device of claim 1, wherein the attachment member includes a trapezoidal rectangular shaped body, wherein the trapezoidal rectangular shaped body is substantially smaller in length than the elongated u-shaped bar.

5. The safety cooking and grate device of claim 1, wherein the attachment member includes a cylindrically shaped body, wherein the cylindrically shaped body is substantially smaller in length than the elongated u-shaped bar.

6. The safety cooking and grate device of claim 1, wherein a plurality of magnets are coupled to a bottom grate side of the safety burner grate.

7. The safety cooking and grate device of claim 1, wherein one or more locking mechanisms are coupled to a bottom grate side of the safety burner grate.

8. The safety cooking and grate device of claim 7, wherein the one or more locking mechanisms include one or more pins.

9. The safety cooking and grate device of claim 7, wherein the one or more locking mechanisms include one or more hooks.

\* \* \* \* \*